(12) United States Patent
Sushkov et al.

(10) Patent No.: US 9,042,906 B1
(45) Date of Patent: May 26, 2015

(54) IDENTIFYING A GEOGRAPHICALLY NEARBY MOBILE COMPUTING DEVICE

(75) Inventors: Oleg O. Sushkov, Sydney (AU); Vadim Gerasimov, Epping (AU); Alexis J. S. Vuillemin, Pymont (AU); Reuben Yu-Pong Kan, Kellyville (AU)

(73) Assignee: Google Inc., Mountain View, CA (US)

( * ) Notice: Subject to any disclaimer, the term of this patent is extended or adjusted under 35 U.S.C. 154(b) by 804 days.

(21) Appl. No.: 13/237,570

(22) Filed: Sep. 20, 2011

(51) Int. Cl.
*H04W 24/00* (2009.01)
*H04W 4/16* (2009.01)

(52) U.S. Cl.
CPC ...................................... *H04W 4/16* (2013.01)

(58) Field of Classification Search
USPC .......... 455/457; 370/338; 340/426.19, 539.13
See application file for complete search history.

(56) References Cited

U.S. PATENT DOCUMENTS

| | | | |
|---|---|---|---|
| 2006/0046709 | A1 | 3/2006 | Krumm et al. |
| 2007/0026857 | A1 | 2/2007 | Kotzin |
| 2008/0216125 | A1 | 9/2008 | Li et al. |
| 2008/0304361 | A1 | 12/2008 | Peng et al. |
| 2009/0233551 | A1 | 9/2009 | Haartsen |
| 2010/0080084 | A1 | 4/2010 | Chen et al. |
| 2010/0130125 | A1 | 5/2010 | Nurmi |

OTHER PUBLICATIONS

Amir, Arnon, Alon Efrat, Jussi Myllymaki, Lingeshwarn Palaniappan, and Kevin Wampler. "Buddy Tracking—Efficient Proximity Detection Among Mobile Friends." INFOCOM; 2004. (36 pages).

Bump Technologies. "General FAQs." Bump Technologies [Retrieved on Apr. 29, 2011]; Retrieved from the Internet <URL: http://bump/faq> (4 pages).

Cai, Liang, Kai Zeng, Hao Chen, and Prasant Mohapatra. "Good Neighbor: Ad Hoc Pairing of Nearby Wireless Devices by Multiple Antennas." UC Davis, Computer Science Department; 2010. (20 pages).

Hinckley, Ken. "Synchronous Gestures for Multiple Persons and Computers." Microsoft Research, Redmond, WA; 2003. (10 pages).

Holmquist, Lars Erik, Friedemann Mattern, Bernt Schiele, Petteri Alahuhta, Michael Beigl, and Hans-W. Gellersen. "Smart-Its Friends: A Technique for Users to Easily Establish Connections Between Smart Artifacts." Computer Graphics and Applications, IEEE; 2004. (6 pages).

Lester, Jonathan, Blake Hannaford, and Gaetano Borriello. "'Are You With Me?'—Using Accelerometers to Determine if Two Devices are Carried by the Same Person." University of Washington, Department of Electrical Engineering; Intel Research Seattle, Seattle WA; 2008. (18 pages).

(Continued)

*Primary Examiner* — Marcos Batista
(74) *Attorney, Agent, or Firm* — Fish & Richardson P.C.

(57) ABSTRACT

In general, the subject matter described in this specification can be embodied in methods, systems, and program products for identifying proximity of a mobile computing device to another mobile computing device. A computing system determines that a set of mobile computing devices are geographically proximate to a first mobile computing device based on identifying that each of the mobile computing devices received a first type of signal from an emitting device for which the first mobile computing device also received the first type of signal. The computing system determines a subset of the mobile computing devices that share a physical space with the first mobile computing device based on identifying that each of the mobile computing devices emitted a second type of signal that was detected by the first mobile computing device, or detected the second type of signal that was emitted by the first mobile computing device.

14 Claims, 10 Drawing Sheets

(56) References Cited

OTHER PUBLICATIONS

Mundy, Ward. "Follow-Me Phoning. Implementing Bluetooth Proximity Detection with Asterisk, Part 1." Ward Mundy's Technolobabblelog [Retrieved on Apr. 29, 2011]; Retrieved from the Internet <URL: http://nerdvittles.com/index.php?p=78> (15 pages).

Peng, Chunyi, Guobin Shen, Yongguang Zhang, Yanlin Li, and Kun Tan. "BeepBeep: A High Accuracy Acoustic Ranging System Using COTS Mobile Devices." SenSys 07, Sydney Australia; 2007. (14 pages).

Sahar, Gul and Gul Jabeen. "Group Formation in Social Network: An Overview." MASAUM Journal of Reviews and Surveys, vol. 1, Issue 1; 2009. (5 pages).

Siksnys, Laurynas, Jeppe Rishede Thomsen, Simonas Saltenis, and Man Lung Yiu. "Private and Flexible Proximity Detection in Mobile Social Networks." Mobile Data Management (MDM), 2010 Eleventh International Conference; 2010. (10 pages).

Witteman, Ing. M.T.. "Efficient Proximity Detection Among Mobile Clients Using the GSM Network." University of Twente, Department of Computer Science Design and Analysis of Communication Systems (DACS); 2007. (71 pages).

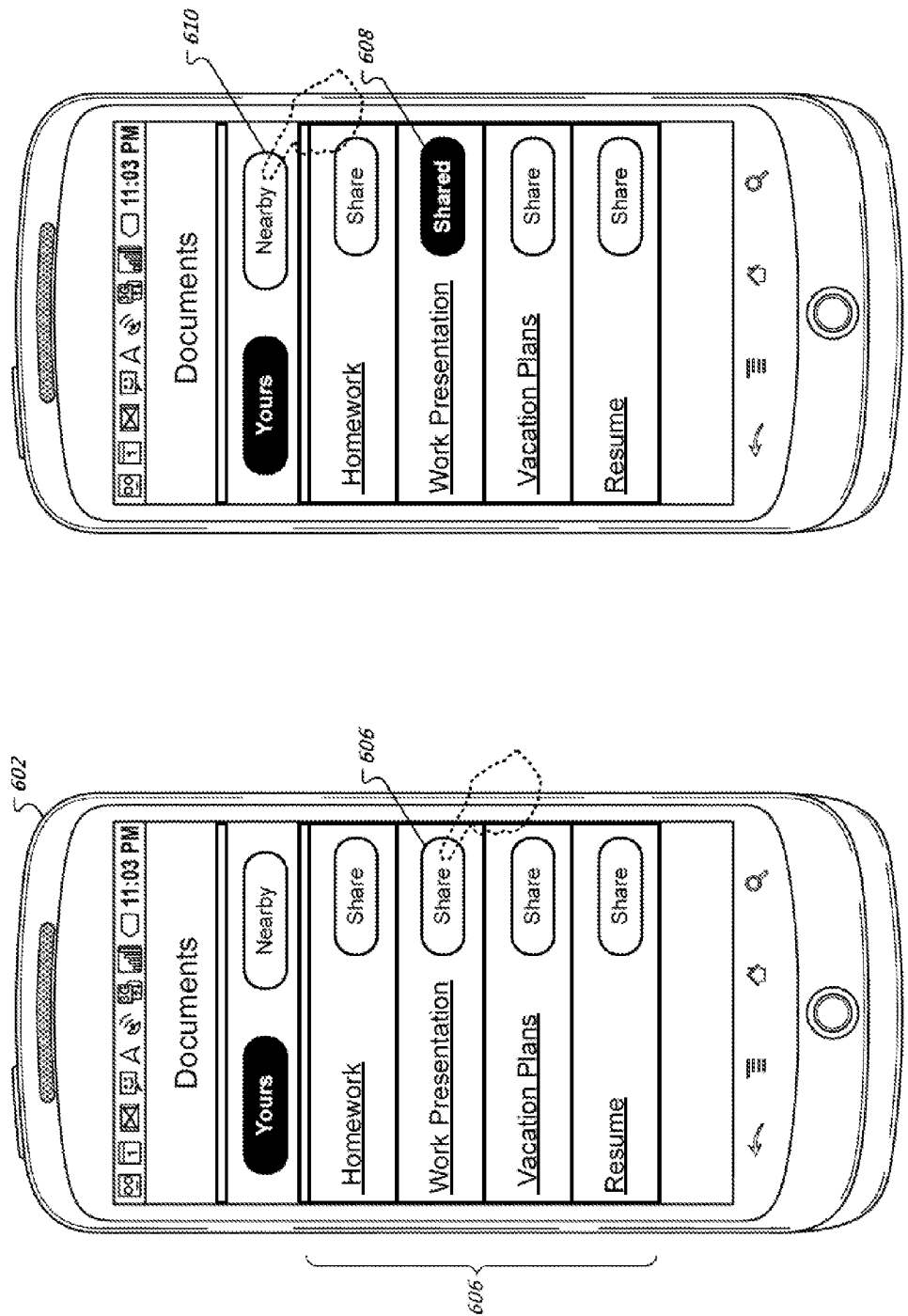

IDENTIFYING A GEOGRAPHICALLY NEARBY MOBILE COMPUTING DEVICE

BACKGROUND

Mobile computing devices such as smart telephones (smartphones or apphones) include mechanisms that enable the devices to identify their geographical locations. For example, a mobile computing device can use Global Positioning System (GPS) techniques to identify the mobile computing device's geographical location. In some examples, a computing system can estimate the geographical location of a mobile computing device based on the base stations with which the mobile computing device is wirelessly communicating. In some examples, a computing system can estimate the geographical location of a mobile computing device based on the wireless routers from which the mobile computing device receives signals.

SUMMARY

This document describes techniques, methods, systems, and other mechanisms for identifying a geographically nearby mobile computing device. In general, a computing system may determine which mobile computing devices are close to each other by using device-to-device signal emissions, including signals that are, by physics, limited from traveling a long distance or through physical structures. Mobile computing devices that detect a signal transmission from an emitting mobile computing device can be determined to be in close proximity to the emitting mobile computing device. In some examples, the device-to-device signal includes a sound wave generated by one device and detected by another.

The device-to-device signal transmission can be performed after the computing system determines that those devices are generally in the same vicinity based on the devices sensing emissions from the same emitting devices such as mobile network base stations or Wi-Fi routers. As such, many mobile computing devices may emit a device-to-device signal at the same time, as long as multiple devices that are in the same vicinity do not emit the device-to-device signal at the same time. The initial step of determining that the devices are in the same general vicinity can be used so that devices are not making noises or other attempts to pair unless they are near each other, and to reduce the number of candidates for pairing when one device detects a sound or other signal generated by another device.

As an alternative to the implementations described in the below description, the present disclosure also includes the following implementations:

Implementation 1 is directed to a computer-implemented method for identifying proximity of a mobile computing device to another mobile computing device. The method includes determining, by a computing system, that a set of mobile computing devices are geographically proximate to a first mobile computing device based at least in part on identifying that each of the mobile computing devices in the set received a first type of signal from an emitting device for which the first mobile computing device also received the first type of signal. The method includes determining, by the computing system, a subset of the mobile computing devices in the set that share a physical space with the first mobile computing device based at least in part on identifying that each of the mobile computing devices in the subset emitted a second type of signal that was detected by the first mobile computing device, or detected the second type of signal that was emitted by the first mobile computing device.

Implementation 2 is related to the method of implementation 1, wherein the second type of signal is a mechanical sound wave type of signal.

Implementation 3 is related to the method of implementation 2, wherein the mechanical sound wave type of signal is in a range of 10 kHz to 28 kHz.

Implementation 4 is related to the method of implementation 2, wherein the set of mobile computing devices are determined as being from a larger group of mobile computing devices; wherein only a single of the mobile computing devices in the set emits the mechanical sound wave type of signal at a same time; and wherein multiple of the mobile computing devices from the larger group emit the mechanical sound wave type of signal at the same time.

Implementation 5 is related to the method of implementation 1, wherein determining the subset of the mobile computing devices is further based at least in part on identifying that each of the mobile computing devices in the subset emitted the second type of signal that was detected by the first mobile computing device, and detected the second type of signal that was emitted by the first mobile computing device.

Implementation 6 is related to the method of implementation 1, wherein the second type of signal does not identify a specific mobile computing device.

Implementation 7 is related to the method of implementation 1, wherein the first type of signal is an electromagnetic signal.

Implementation 8 is related to the method of implementation 7, wherein the emitting device is selected from a group consisting of: (i) a base station for a mobile network, and (ii) a wireless router.

Implementation 9 is related to the method of implementation 7, wherein the emitting device from which a second mobile computing device in the set and the first mobile computing device received the first type of signal is different than the emitting device from which a third mobile computing device in the set and the first mobile computing device received the first type of signal.

Implementation 10 is related to the method of implementation 7, wherein determining that the set of mobile computing devices are geographically near to the first mobile computing device includes identifying, for each particular mobile computing device in the set, that a proportion of a first quantity of emitting devices to a second quantity of emitting devices exceeds a threshold proportion value; wherein the first quantity of emitting devices represents a quantity of emitting devices from which both a particular mobile computing device from the set and the first mobile computing device received signals; and wherein the second quantity of emitting devices represents (i) a quantity of emitting devices from which the particular mobile computing device received signals, (ii) a quantity of emitting devices from which the first mobile computing device received signals, or (iii) a quantity of emitting devices from which the particular mobile computing device received signals together with a quantity of emitting devices from which the first mobile computing device received signals.

Implementation 11 is related to the method of implementation 1, wherein determining that the set of mobile computing devices are geographically near to the first mobile computing device includes identifying that each of the mobile computing devices in the set are within a threshold distance from the first mobile computing device using a satellite-based geographical location identification system.

Implementation 12 is directed to a computer-implemented method. The method includes accessing, by a computing system, information that identifies a set of mobile computing devices that were determined to be geographically near to a first mobile computing device based at least in part on the first mobile computing device and the set of mobile computing devices having received wireless electromagnetic signals emitted from one or more computing systems that are not a part of the set of mobile computing devices. The method includes determining, by the computing system, a subset of the mobile computing devices in the set that share a physical space with the first mobile computing device based on each of the subset of mobile computing devices having detected a mechanical sound wave that was emitted by the first mobile computing device, or having emitted the mechanical sound wave that was detected by the first mobile computing device.

Implementation 13 is related to the method of implementation 12, wherein characteristics of the mechanical sound wave identify the mechanical sound wave as being part of a process for identifying mobile computing devices that share the physical space.

Implementation 14 is related to the method of implementation 13, wherein the set of mobile computing devices are determined from a group of mobile computing devices; and wherein multiple mobile computing devices from the group emit the mechanical sound wave of the characteristics at a same time.

Other embodiments include corresponding computer-readable storage devices storing instructions that, when executed by one or more processing devices, perform operations according to the above-described methods. Other embodiments may include systems and apparatus that include the described computer-readable storage devices and that are configured to execute the operations using one or more processing devices.

Implementation 15 is directed to a computerized system. The system includes computer-readable memory, accessible to a computing system, that stores information that indicates a set of computing devices that have been determined to have a first indication of geographical proximity to a first computing device. The system includes a first computing sub-system, at the computing system, that schedules times for the computing devices from the set to mechanically emit an audio wave using speakers of the respective computing devices. The system includes a second computing sub-system, at the computing system, to determine that one or more of the computing devices from the set have a second indication of geographical proximity to the first computing device based on the first computing device detecting the mechanically emitted audio wave at a time or times during which the one or more of the multiple computing devices was scheduled to emit the mechanical audio wave.

Implementation 16 is related to the method of implementation 15, further including a third computing sub-system, at the computing system, to determine that the computing devices from the set have the first indication of geographical proximity to the first computing device based on the computing devices from the set and the first computing device receiving an electromagnetic transmission from a same electromagnetic emitting device.

Implementation 17 is related to the method of implementation 16, further including the first computing device.

Implementation 18 is related to the method of implementation 15, wherein the second indication of geographical proximity provides an indication of closer geographical proximity between the first mobile computing device and another mobile computing device than the first indication of geographical proximity.

Particular embodiments can be implemented, in certain instances, to realize one or more of the following advantages. A determination that mobile computing devices are nearby other mobile computing devices can be performed with reduced power consumption. An accuracy of determinations that mobile computing devices are nearby to each other may also be increased. A determination of mobile computing devices that are nearby to each other can include an identification of those mobile computing devices that are geographically close and not separated by a physical barrier in distinction to mobile computing devices that are geographically close but that are separated by the physical barrier. Moreover, the identification can be performed without computing system knowledge of the physical barrier.

The details of one or more embodiments are set forth in the accompanying drawings and the description below. Other features, objects, and advantages will be apparent from the description and drawings, and from the claims.

DESCRIPTION OF DRAWINGS

FIGS. 6A-6C show a user interface for sharing one or more documents with nearby users, and for viewing one or more documents shared by nearby users.

Like reference symbols in the various drawings indicate like elements.

DETAILED DESCRIPTION

This document generally describes techniques for identifying a geographically nearby mobile computing device. In general, a computing system can determine that mobile computing devices are nearby to each other by using audio signals that the mobile computing devices generate with speakers. For example, a mobile computing device may generate a "chirp" at a frequency that is high enough in order to be difficult for humans to hear. The computing system can designate those mobile computing devices that detect the chirp as nearby mobile computing devices.

A computing system may schedule when particular mobile computing devices chirp and listen for chirps. In order to increase the regularity with which mobile computing devices chirp, the computing system may schedule multiple mobile computing devices to chirp at the same time. The identification of which mobile computing devices chirp at any given time can be based on the results of a previous determination of mobile computing devices that are generally in the same vicinity, for example, using GPS, cell-tower identification, and Wi-Fi location identification techniques. In some examples, only a single mobile computing device in a given vicinity chirps at any given time.

Figure 1:
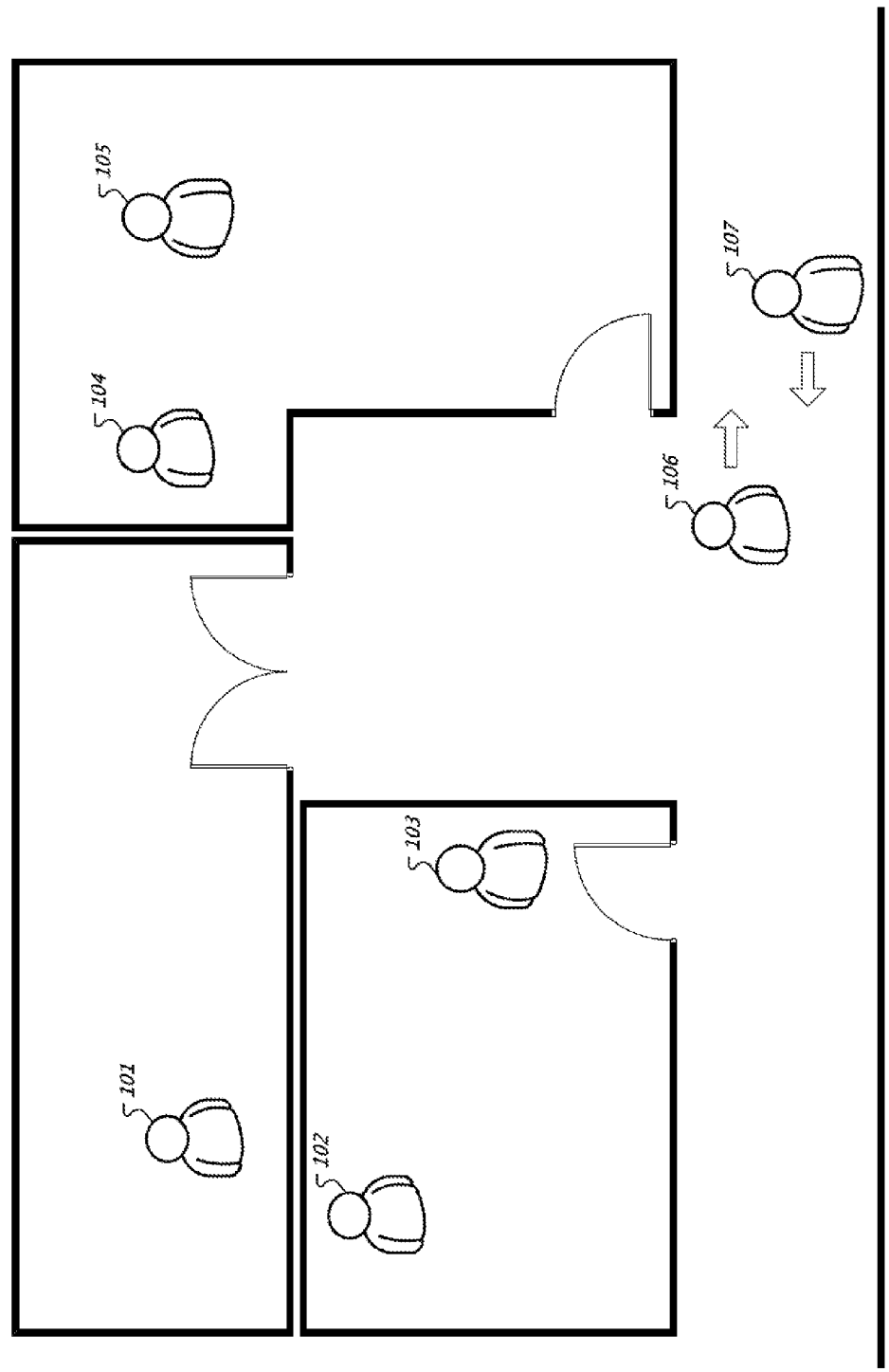
FIG. 1 shows a schematic layout of a building in which people carrying mobile computing devices are located.

As an illustration, FIG. 1 shows a schematic layout of a building in which seven people 101-107 who are carrying mobile computing devices are located. The location of each mobile computing device is illustrated as a location of the individual in FIG. 1. Traditional techniques for identifying the location of mobile computing devices may provide limited results for determining those devices that are nearby to each other. For example, GPS mechanisms may fail to identify the location of a mobile computing device as well when the mobile computing device is indoors, as when the mobile computing device is outdoors.

Further, location identification based on the known geographical locations of other emitting devices (e.g., cellular tower emitters and Wi-Fi emitters) may associate a mobile computing device with a large geographical region (e.g., a geographical region that centers around an emitting device and has a radius of several kilometers). As such, a computing system can have difficulty identifying mobile computing devices that are close together when the mobile computing devices are identified as generally being in the same vicinity based on the location of emitting systems.

Further, traditional techniques for identifying the location of mobile computing devices may use additional energy in order to increase the accuracy of the determined geographical location. The increased accuracy may be obtained by performing additional location readings with one or more radios of the mobile computing device, an energy intensive process.

In any event, even if a computing system knew the geographical location of the mobile computing devices in FIG. 1 with high accuracy, the computing system may not be able to determine which mobile computing devices are in the same room without knowledge of the building's structure. For example, the first user 101 and the second user 102 are geographically closer together than the second user 102 and the third user 103. The second user 102 and the third user 103, however, are in the same room while the first user 101 is in a different room than these users.

As such, in order to determine those devices that are not separated by a substantial physical barrier, users' mobile computing devices can emit "chirps" that are generated by speakers in the mobile computing devices. The chirps may occur at a high frequency (e.g., 18 kHz) and may not propagate through walls and other physical structures as easily as electromagnetic waves. Accordingly, mobile computing devices that are known to be geographically in the vicinity of an emitting mobile computing device may not detect a chirp from the emitting mobile computing device if the emitting mobile computing device is in a different room.

As described with greater detail throughout this disclosure, a computing system may first identify estimated geographical locations of mobile computing devices based on signals that the mobile computing devices receive from external devices (e.g., GPS satellites, cellular telephone base stations, and Wi-Fi routers), and may then schedule chirps so that multiple mobile computing devices chirp at the same time, but so that a mobile computing device that is listening for a chirp may not detect the chirp of more than one mobile computing device at a given time.

In some examples, the computing system may schedule the chirps so that mobile computing devices that are simply passing each other are not identified as being nearby each other. Such a scenario can occur when users are walking past each other, as illustrated by the sixth user 106 and the seventh user 107 in FIG. 1. For example, in order for a computing system to designate two mobile computing devices as geographically nearby each other, a first of the two devices must detect a chirp from a second of the two devices during a first time period, and the second device must detect a chirp from the first device during a second time period. The first time period and the second time period may be spaced apart in time (e.g., by ten seconds) so that both mobile computing devices would have to be within audible range of each other over a period of at least ten seconds for the computing system to designate the devices as nearby each other.

Figure 2:
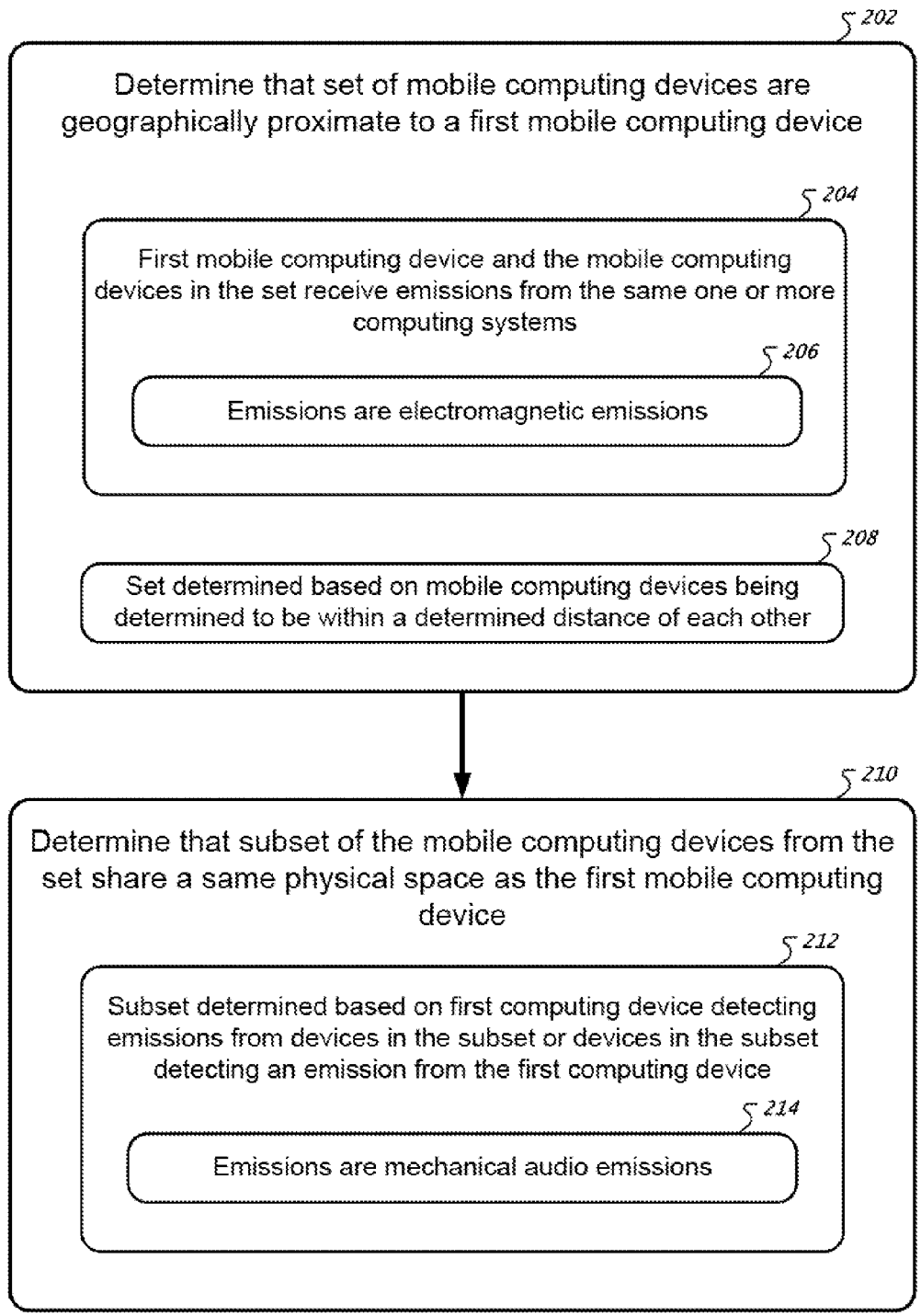
FIG. 2 shows a flowchart of an example process for identifying that one or more mobile computing devices are geographically near to a first mobile computing device.

FIG. 2 shows a flowchart of an example process for identifying that a mobile computing device is geographically near to another mobile computing device.

In box 202, a computing system determines that a set of mobile computing devices are geographically proximate to a first computing device. For example, the computing system may receive, for each of a plurality of mobile computing devices that are communicating with a network, information that the computing system can use to identify a location of each mobile computing device or any proximity relationships to other mobile computing devices. Proximity relationships between any two mobile computing devices may be referred to by this disclosure as "weak" relationships, even though at least some of the weak relationships may be based on a strong indication of geographical proximity.

The computing system can store an indication of each computing device and its zero or more proximity relationships to other mobile computing devices. Such information may be stored in a table that identifies relationships between mobile computing devices. A set of mobile computing devices that are determined to be geographically proximate to the first mobile computing device may be those mobile computing devices from the plurality of mobile computing devices that have weak relationships with the first computing device.

Figure 3:
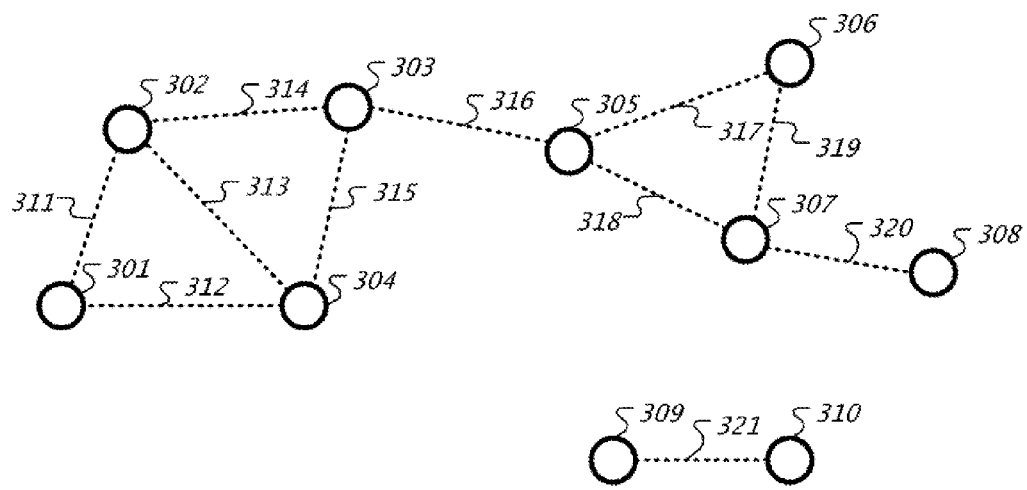
FIG. 3 shows a graph that illustrates weak relationships between mobile computing devices.

A visual representation of mobile computing devices and weak relationships between the devices is illustrated in FIG. 3, which shows a graph that illustrates weak relationships between mobile computing devices. Mobile computing devices are illustrated by nodes 301-310 and relationships between the mobile computing devices are illustrated by dotted lines 311-321.

The collection of mobile computing devices 301-310 can illustrate a plurality of mobile computing devices, node 307 can illustrate the first mobile computing device, and nodes 305, 306, and 308 can illustrate the set of mobile computing devices that are determined to be geographically proximate to the first computing device.

In box 204, the mobile computing devices are determined to be in the set based on the mobile computing devices receiving emissions from the same one or more computing systems. For example, the computing system may receive data that identifies base stations of a mobile computing device communication network (e.g., one or more cellular telephone towers, Wi-Fi routers, switches and/or access points, etc.) that mobile computing devices can sense. A mobile computing device may sense a base station if any combination of the following criteria are satisfied: (i) the mobile computing device can transmit data to the base station and receive a responsive communication from the base station, (ii) the mobile computing device can identify a signal that was emitted by the base station and that exceeds a threshold power level, and (iii) the base station can identify a signal that was generated by the mobile computing device and that exceeds a threshold power level.

The computing system may determine that a weak relationship between two mobile computing devices exists based on a common quantity of base stations that both mobile computing devices can sense exceeding a threshold level. In some examples, the threshold level is one. As such, if two mobile computing devices can sense the same base station, the computing system may determine that a weak relationship exists between the two mobile computing devices. In some examples, the threshold is a greater number of commonly sensed base stations (e.g., 2, 3, 4, or 5).

In some examples, the threshold is a proportion of commonly sensed base stations to a total amount of base stations that are sensed by one or both of the two devices. As an example, the computing system may calculate an "affinity" value between any two mobile computing devices "a" and "b".

$$Affinity(a, b) = \frac{2 * TransmittersSensedByBothDevices}{TransmittersSensedByDeviceA + TransmittersSensedByDeviceB}$$

As such, the affinity value between devices "a" and "b" may equal two times the number of base stations that are sensed by both device "a" and device "b" divided by the number of base stations that are sensed by device "a" summed with the number of base stations that are sensed by device "b." The criterion for forming a weak relationship between devices "a" and "b" may be satisfied if the affinity value exceeds a predetermined threshold value. In various examples, the set of transmitters that are sensed by both the first computing device and each other mobile computing device in the set may be different from each other.

In various examples, weak relationships are formed between two mobile computing devices based on the two mobile computing devices sensing Wi-Fi or other signals that are emitted by devices that are not from the plurality of mobile computing devices. In various examples, the computing system uses sensed signals from multiple different types of emitting devices to determine an affinity value between two devices. For example, the computing system may calculate a base station affinity value and a Wi-Fi affinity value for the two devices, and may generate a normalized weighted sum of the base station and Wi-Fi affinity values.

In various examples, weak relationships can be formed, at least in part, based on wireless signals that were emitted by mobile computing devices from the plurality of mobile computing devices (e.g., one or more of mobile computing devices 301-310). For example, mobile computing devices may sense Wi-Fi or B signals from other mobile computing devices from the plurality of mobile computing devices. Such sensed signals may be used as part of an affinity determination between two mobile computing devices.

In various examples, weak relationships are formed based on mobile computing devices receiving signals that are emitted from beacons that have been intentionally introduced into an environment. For example, a university may place Bluetooth beacons at designated locations throughout a campus in order to aid in the formation of weak relationships. The intentionally introduced beacons may emit WiFi, Bluetooth, or mechanical sound signals, for example. The intentionally introduced beacons may be "anchored" to a location and may have a special signature that can inform mobile computing devices about the location of the beacon (and by extension the approximate location of the mobile computing devices). The signature might be added to the beacon WiFi or Bluetooth ID, for example, and may carry the beacon's geographic location as coordinates and/or a description of the location where the beacon is placed.

In box 206, the emissions received from the base stations are electromagnetic emissions. An electromagnetic transmission is a transmission that includes an electromagnetic wave. An electromagnetic wave is a wave that can emit through a vacuum. Example electromagnetic waves include light, microwaves, and x-rays. On the other hand, an electromagnetic transmission may not include a sound wave. Electromagnetic waves may not be generated by speakers. Sound waves are defined below, with reference to box 214.

In box 208, a characteristic of the first criterion includes mobile computing devices being determined to be within a determined distance of each other. For example, the mobile computing devices or the computer system may perform operations to identify estimated geographical locations of the mobile computing devices. The computer system may determine a distance between any two mobile computing devices based on the estimated geographical locations.

In some examples, the estimated geographical locations may be determined using a satellite-based geographical location identification system. An example satellite-based geographical location identification system is the Global Positioning System (GPS). In such a system, satellites emit signals that encode time information and that identify the emitting satellite. A mobile computing device may be able to estimate its geographical location if the mobile computing device receives a signal from at least three satellites. The mobile computing device may be able to determine an elevation of its geographical location if the mobile computing device receives a signal from at least four satellites.

The estimated geographical location can be determined using other mechanisms. For example, the estimated geographical location may be determined based on the known location of emitting devices that are sensed by a mobile computing device. For example, the location of a mobile computing device may be determined based on triangulation techniques using base stations of a mobile computing device communication network.

The computing system may designate two mobile computing devices as having a weak relationship with each other if the estimated geographical distance between the two mobile computing devices based on the devices' estimated geographical locations is under a threshold distance. In some examples, the threshold distance increases as the accuracy of the location estimations decreases.

In box 210, the computing system determines that a subset of the mobile computing devices from the set of mobile computing devices share a same physical space as the first mobile computing device. For example, the computing system may receive, for each of the determined set of mobile computing devices, information that the computing system can use to identify relationships to other mobile computing devices from the set that satisfy additional criteria. These relationships may be referred to by this disclosure as "strong" relationships. The computing system can store an indication of each mobile computing device and its zero or more strong relationships to other mobile computing devices. Such information may be stored in a table that identifies strong relationships between mobile computing devices.

A same physical space can indicate that the subset of mobile computing devices are devices that are, as a whole, geographically closer to the first computing device than the mobile computing devices in the set. For example, the set of mobile computing devices may include hundreds of mobile computing devices in a region of a city. The subset of mobile computing devices may include half a dozen mobile computing devices that are in a same room as the first mobile computing device. Indeed, in some examples, the subset of mobile computing devices is determined using device-to-device transmission of mechanical audio signals that do not easily penetrate walls while the set of mobile computing devices is determined based on the transmission of electromagnetic transmission from external devices. These electromagnetic transmissions may more easily penetrate physical structures. A physical space can include also open areas, for example, an open field in a meadow.

In box 212, the subset of mobile computing devices is determined based on the first mobile computing device detecting emissions from devices in the subset or the devices in the subset detecting an emission from the first computing device. The computing system may schedule emissions so that not all of the mobile computing devices emit at the same time. Rather, some mobile computing devices may emit and some mobile computing devices may "listen" for emissions at any given time.

The computer system may schedule multiple mobile computing devices from the plurality of mobile computing devices to emit at the same time. Because, in some examples, the emitted signals may not include characteristics that identify the emitting devices, the computing system may schedule mobile computing device emissions so that devices that are determined to be geographically close to each other do not emit at the same time. As such, the computing system may designate mobile computing devices that are sufficiently far apart from each other as emitting mobile computing devices. Thus, only a single mobile computing device in the determined subset of mobile computing devices may emit at a given time. The computing system may designate the remaining mobile computing devices as listening mobile computing devices. This device-to-device transmission and scheduling is illustrated in FIGS. 4A-D.

Figure 4A:
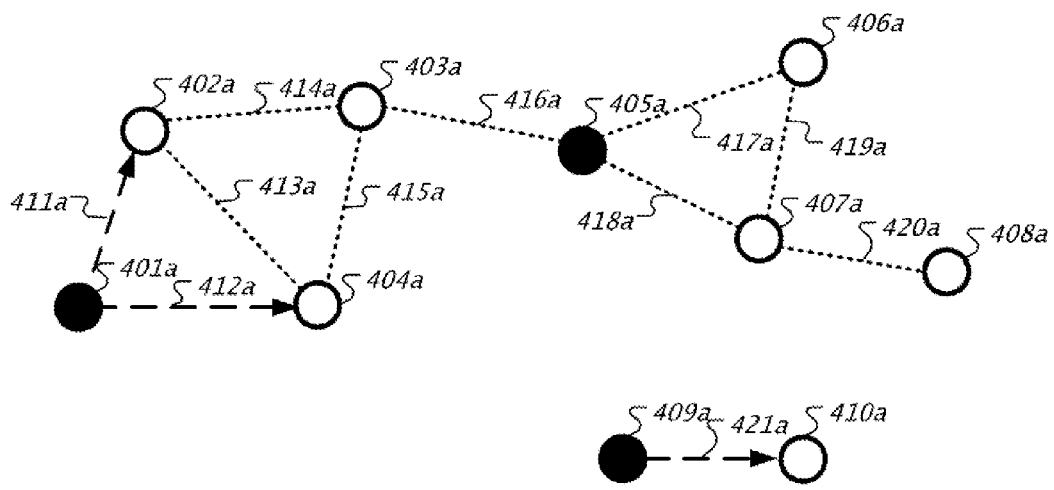
FIGS. 4A-4D show graphs that illustrate a process of determining strong relationships between mobile computing devices.

In FIG. 4A, the computing system has scheduled the mobile computing devices represented by nodes 401a, 405a, and 409a as emitting mobile computing devices. These emitting mobile computing devices are illustrated in the figure as the nodes with solid fill circles. In this example, a limiting criterion for scheduling emitting mobile computing devices is that emitting mobile computing devices may not be connected to each other, through weak relationships, by only one listening mobile computing device. In some examples, the limiting criterion includes a different number of listening mobile computing devices between the emitting mobile computing devices (e.g., 1, 3, 4, 5, 6, 7, or 8 listening mobile computing devices).

In some examples, a limiting criterion for scheduling emitting mobile computing devices is based on a determined geographical distance between mobile computing devices. For example, the limiting criterion may be that at least two-hundred meters must separate emitting mobile computing devices.

Accordingly, during a first time period, the mobile computing devices represented by nodes 401a, 405a, and 409a emit a signal. The mobile computing devices that are identified as having a weak relationship with the emitting mobile computing devices may listen for the signal. The listening mobile computing devices that determine that they have detected the signal may transmit to the computing system an indication that they detected the signal.

In some examples, a receipt of the signal by a listening mobile computing device is sufficient to form a strong relationship between the listening mobile computing device and the emitting mobile computing device. In other examples, a receipt of the signal by a listening mobile computing device satisfies half the criterion for forming a strong relationship. The other half of the criterion may include the emitting mobile computing device detecting a signal that was emitted by the listening mobile computing device. As such, a strong relationship may be formed upon bi-directional device-to-device communication of a signal.

In FIG. 4A, the dashed lines 411a, 412a, and 421a illustrate weak relationships between mobile computing devices where half of the criterion for forming strong relationships has been satisfied. The arrows point from a node that represents a mobile computing device that emitted the signal to a node that represents a mobile computing device that detected the signal.

In some examples, the computing system may not form a relationship between a first mobile computing device and a second mobile computing device, when the second mobile computing device detects a signal from the first mobile computing device, and when the first mobile computing device and the second mobile computing device do not have a weak relationship. In other words, two mobile computing devices may need to have a weak relationship in order to form a strong relationship.

In some examples, the computing system may assume that a second mobile computing device that detects a signal is detecting the signal from a first mobile computing device, because the first mobile computing device is the only mobile computing device that emitted the signal during the time period from among the mobile computing devices with which the second mobile computing device has a weak relationship. In such examples, the signal may not identify the emitting mobile computing device.

Figure 4B:
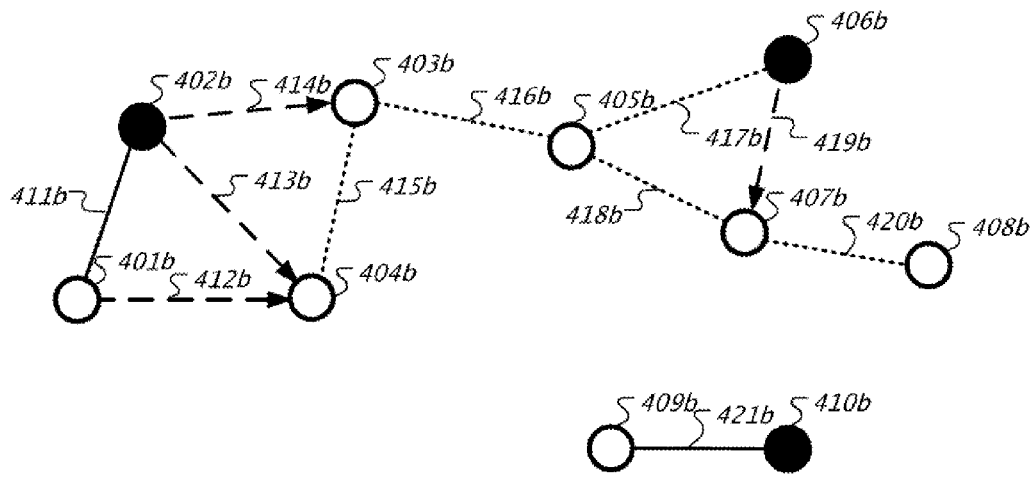

In FIG. 4B, the computing system schedules the mobile computing devices illustrated by nodes 402b, 406b, and 410b for transmission. In this example, the mobile computing devices represented by nodes 401b, 403b, 404b, 407b, and 409b detected the transmission. Node 405b did not detect the transmission. As such, half the criteria for forming a strong relationship was satisfied for the relationships that are illustrated by dashed lines 413b, 414b, and 419b. Further, the full criteria for forming a strong relationship was satisfied for the relationships that are illustrated by solid lines 411b and 421b.

Figure 4C:
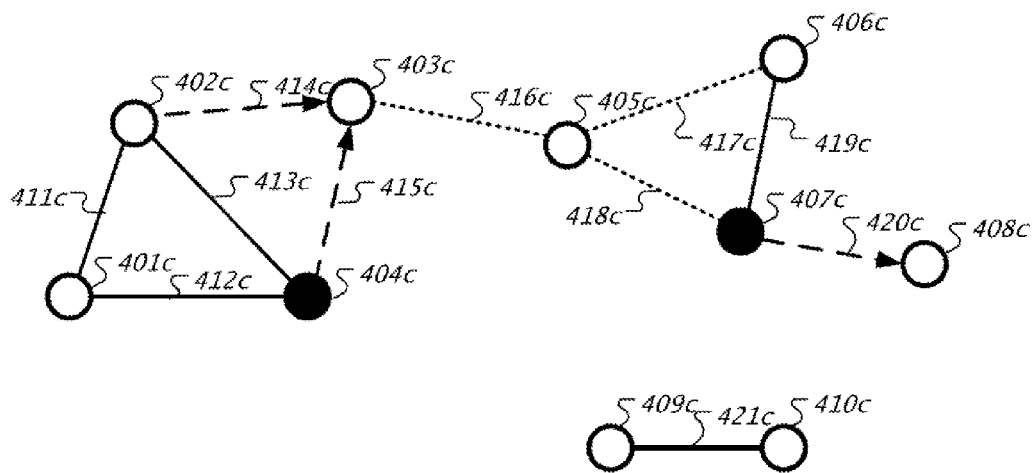

In FIG. 4C, the computing system schedules the mobile computing devices illustrated by nodes 404c and 407c for transmission. In this example, nodes 401c, 402c, 403c, 406c, and 408c detected the transmission. Node 405c did not detect the transmission. As such, half the criteria for forming a strong relationship was satisfied for the relationships that are illustrated by dashed lines 415c and 420c. Further, the full criteria for forming a strong relationship was satisfied for the relationships that are illustrated by solid lines 412c, 413c, and 419c.

Figure 4D:
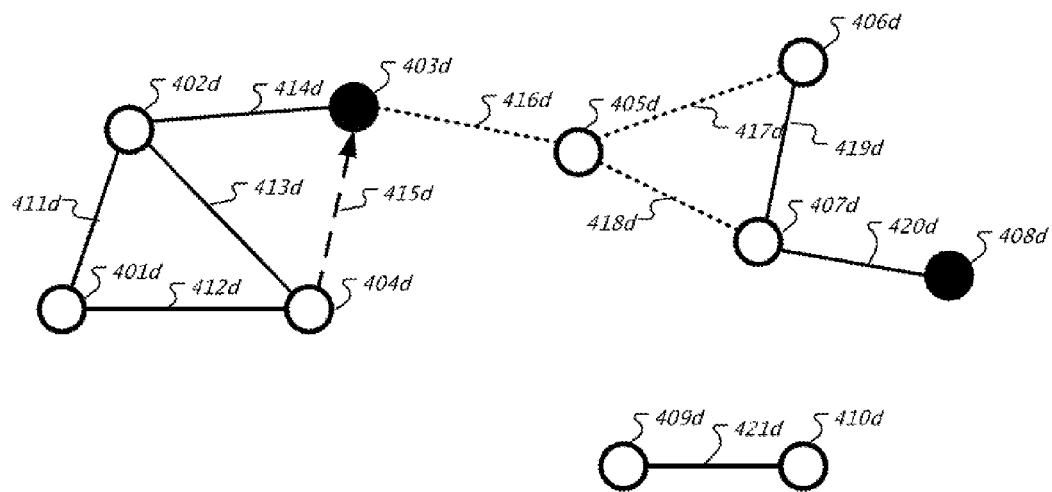

In FIG. 4D, the computing system schedules the mobile computing devices illustrated by nodes 403d and 408d for transmission. In this example, nodes 402d and 407d detected the transmission. Node 404d did not detect the transmission. As such, only half of the full criterion for forming a strong relationship was satisfied for the relationship that is illustrated by dashed line 414d. The full criterion for forming a strong relationship was satisfied for the relationship that is illustrated by solid line 420d.

Figure 5:
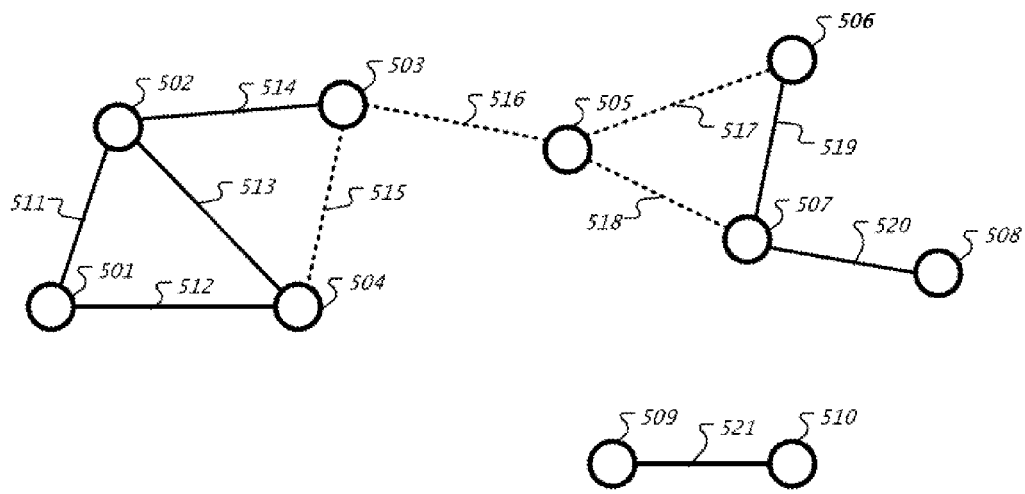
FIG. 5 shows a graph that illustrates strong relationships between mobile computing devices.

FIG. 5 shows strong relationships determined between mobile computing devices. In this example, the computing system determined that the relationships represented by solid lines 511, 512, 513, 514, 519, 520, and 521 should be strong relationships. The computing device determined that relationships represented by dotted lines 515, 516, 517, and 518 should remain weak relationships. In this example, the relationship represented by dotted line 515 remains a weak relationship because the dashed line 415d (in FIG. 4D) indicates that emissions were not acknowledged by both of the mobile computing devices that are represented by nodes 403d and 404d.

In the illustration that is provided by FIGS. 3, 4A-4D and 5, suppose that a first mobile computing device is represented by node 307 (and thus nodes 407a-d and node 507). A plurality of mobile computing devices can include all of the mobile computing devices that are illustrated by nodes 301-310 in FIG. 3. The set of mobile computing devices with which the first mobile computing device has a determined weak relationship can be illustrated by nodes 305, 306, and 308 in FIG. 3. The one or more mobile computing devices with which the first mobile computing device has a determined strong relationship is illustrated by node 508 in FIG. 5.

In box 214, the emission is a mechanical audio signal. A mechanical audio signal is a transmission that includes a sound wave. A sound wave is a mechanical wave which needs a medium to emit through. A sound wave is an oscillation of pressure emitted through a compressible medium such as solid, liquid, or gas. The mechanical audio signal may be generated by a speaker, which is can be an electroacoustic transducer that produces sound in response to an electrical audio signal input.

In some examples, mobile computing devices may generate a sound wave of 18 kHz by a piezoelectric speaker. In this disclosure, the term sound wave does not necessarily refer to an audio wave that can be heard by humans. Indeed, a mobile computing device "chirp" that includes a sound wave of a frequency above the threshold of ordinary human hearing may, in some examples, be beneficial so that human users of mobile computing devices are not distracted by mobile computing device chirping.

High frequency sound waves may not propagate through solid structures as easily as low frequency sound waves or electromagnetic waves. As such, the use of high frequency sound wave "chirps" for device-to-device communication can be particularly beneficial in determining which mobile computing devices are located close by a first mobile computing device, and that are not separated from the first mobile computing device by a physical structure (e.g., a wall).

In various examples, the "chirp" generated by an emitting mobile computing device is a 20 kHz mechanical audio sine wave that is emitted for three seconds. A listening mobile computing device may detect an emitted chirp by performing signal correlation. In various examples, the listening mobile computing device may sample, at 44.1 kHz, audio received by a microphone for three seconds. A signal correlation value may be determined by the formula:

$$SignalCorrelation = SinCorrelation^2 + CosCorrelation^2$$

where $$SinCorrelation = Sum(signal(t)*sin(\omega t))$$

and $$CosCorrelation = Sum(signal(t)*cos(\omega t)).$$

In this illustration, the signal correlation uses both the sine correlation and the cosine correlation in order to detect a signal at the identified frequency with any phase shift. In other words, the value for the signal correlation may be independent of phase. Omega indicates the anticipated frequency of the emitted chirp. In various examples, a listening mobile computing device detects an emitted chirp by forwarding received audio to a remote system that performs the signal correlation.

If the signal correlation value is above a threshold value, a mobile computing device may determine that the mobile computing device detected a chirp, and may forward an indication that the mobile computing device detected the chirp to the computing system. If the signal correlation value is not above the threshold value, the mobile computing device may determine that the mobile computing device did not detect a chirp, and may not forward an indication that the mobile computing device detected the chirp to the computing system.

Performing a signal correlation can require less computational resources than performing a full power spectrum or Fourier transform. In other examples, however, the mobile computing device or another system performs a full power spectrum or Fourier transform on the audio signal received by the mobile computing device in order to determine whether the mobile computing device detected a chirp.

In various examples, the emitting mobile computing device emits a mechanical audio signal that has been spread in the frequency domain, resulting in a signal with a bandwidth that is wider than a signal that was modulated by a single frequency. Such spread spectrum techniques may be applied across a wide band of sound (e.g., 10 kHz or greater). In such examples, the intensity of the signal at any given frequency may be low enough that human listeners have difficulty hearing the spread spectrum chirp or cannot hear the spread spectrum chirp.

In some examples, the computing system schedules transmission of chirps so that multiple nearby devices can chirp at the same time. For example, the computing system may be able to determine which one or more chirps a mobile computing device detected from a multiple chirps by multiple respective nearby mobile computing devices based on the chirps being emitted at different frequencies or the chirps encoding information that identifies sources of the chirps.

In various examples, the computing system performs techniques to identify strong relationships using passive background sound detection. For example, in addition to or instead of chirping, mobile computing devices may listen to environmental noise. The mobile computing device or the computing system may generate signatures of the environmental noise and may compare the signatures generated for those mobile computing devices that share weak relationships to each other. If two compared signatures exceed a threshold level of similarity, the computing system may designate the respective mobile computing devices as having a strong relationship with each other.

A mobile computing device may not report any information that can be used to identify a geographical location of the mobile computing device without a user of the mobile computing device explicitly providing authorization for such data collection by either the mobile computing device or by an external computing system. In other words, a default setting of the mobile computing device may be to not collect information that can be used to identify a location of the mobile computing device. The user may need to explicitly opt-in to such data collection.

The determination of the one or more mobile computing devices with which a first mobile computing device has a strong relationship can be used to provide various services to a user of the first mobile computing device. Some of these services are illustrated in FIGS. 6A-6C and 7.

Figure 6C:
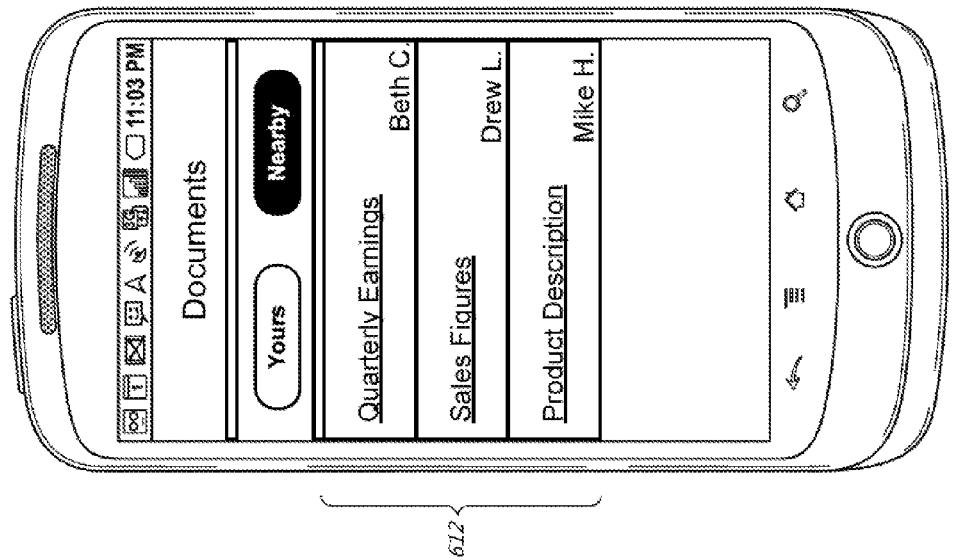

FIGS. 6A-6C illustrate a user interface for sharing one or more documents with nearby users, and for viewing one or more documents shared by nearby users. In FIG. 6A, a particular mobile computing device is displaying a screen of a "Documents" application program. For example, a particular user of the particular mobile computing device 602 may have selected an icon for the documents application program on the home screen of the mobile computing device. In response, the screen of FIG. 6A is displayed to the user. The documents application program shows a list 604 of documents that the particular user of the particular mobile computing device has created.

The particular user may be in a meeting and may want to share the "Work Presentation" document with other users that are in the same room. As such, the user may select the "Share" graphical interface element 606. In response, the selected graphical interface element may be replaced by the "Shared" graphical interface element 608 that is shown in FIG. 6B.

The user may then select the "Nearby" graphical interface element 610 in order to prompt the documents application program to show any documents that are being shared by users of mobile computing devices that have been determined to be nearby to the particular mobile computing device. Such nearby users may be the users of mobile computing devices with which the particular mobile computing device 602 has been determined to have strong relationships. The application program then shows, in FIG. 6C, a list 612 of nearby documents that have been shared by users of nearby mobile computing devices. The list 612 shows three documents from three different users of nearby mobile computing devices. The particular user may select a document to view the content of the document.

Figure 7:
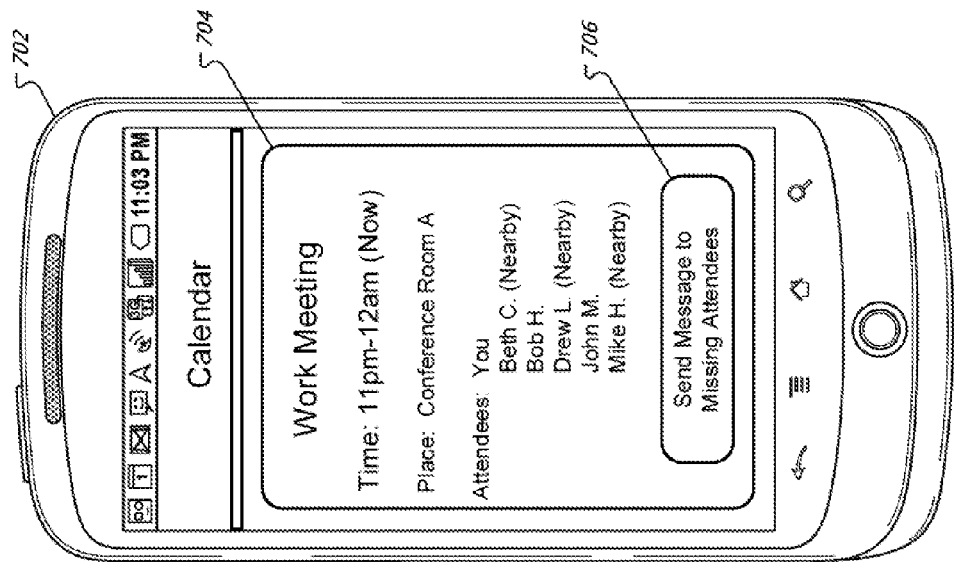
FIG. 7 shows a user interface of an application program.

FIG. 7 illustrates a user interface of a "Calendar" application program. In this example, a particular user of a particular mobile computing device 704 has arrived in a room in which a meeting is scheduled for multiple attendees. The particular user is able to see that all meeting attendees have not yet arrived, but does not know which individuals are missing. As such, the user navigates to the display 704 for the scheduled meeting. The display 704 for the scheduled meeting shows that six attendees have been invited to the meeting: the user; Beth C.; Bob H.; Drew L.; John M.; and Mike H.

The display 704 shows that three of the attendees have mobile computing devices that are determined to be nearby to the particular mobile computing device 702. Accordingly, it is possible that the other scheduled attendees (i.e., Bob H. and John M.) have not yet arrived to the meeting. As such, the user may select the "Send Message to Missing Attendees" graphical user interface element 706. In response, an alert (e.g., an email or a text message) may be emitted to the mobile computing devices for users that are not determined to be nearby the particular mobile computing device 702.

A particular mobile computing device may use a determination of nearby mobile computing devices (i.e., those device with which the mobile computing device has a strong relationship) in other manners. For example, a user of a mobile computing device may share contact information with users of nearby mobile computing devices. Thus a user may view of list of nearby mobile computing devices and may "push" contact information to any one or more of the nearby mobile computing devices by selecting the one or more mobile computing devices from the list of nearby mobile computing devices.

In some examples, a particular mobile computing device may display a profile for the user of each nearby mobile computing device. A profile can include any combination of the user's name, contact information, job title, and interests. As such, individuals that are getting to know one another (e.g., employees in a new employee orientation meeting) may have convenient access to a list of the individuals in the room.

In some examples, the particular user of the particular mobile computing device may provide users of nearby mobile computing devices with the ability to temporarily access to the particular user's social network profile page. Once the other users are no longer nearby, however, the other users may no longer have temporary access to the particular user's social network profile page. Rather, the other users may need to request a social network relationship with the particular user.

In some examples, a user of a social network application program may "check in" at various venues. As the user checks-in at a venue, the social network application program may provide the user with a list of nearby friends of the user (e.g., as determined using strong relationships), and may allow the user to remind the nearby friends to check in at the venue, for example, by selecting a "Remind nearby friends to check in" graphical interface element. In some examples, a user may permit particular social network friends to check in for the user when the particular social network friends are nearby to the user. As such, when two individuals are participating in activities together, one of the users may check-in for the other user using the one user's mobile computing device so long as both users' mobile computing devices are determined to be nearby to each other.

The use of sound waves to determine those mobile computing devices that are nearby may increase a user's likelihood to share information. Because sound waves may not travel as easily through solid physical structures, a user of a mobile computing device may be comfortable that he is able to see everyone that would be able to access documents or other information that the user shares. As such, the user may be more likely to share documents with nearby mobile computing devices.

This disclosure uses the terms "emit" and "transmit" interchangeably. For example, a signal that is emitted into a medium may be a signal that is transmitted into the medium. The use of the term "transmit" does not necessarily imply that the transmitted signal is designated for receipt by a particular computing device.

Figure 8:
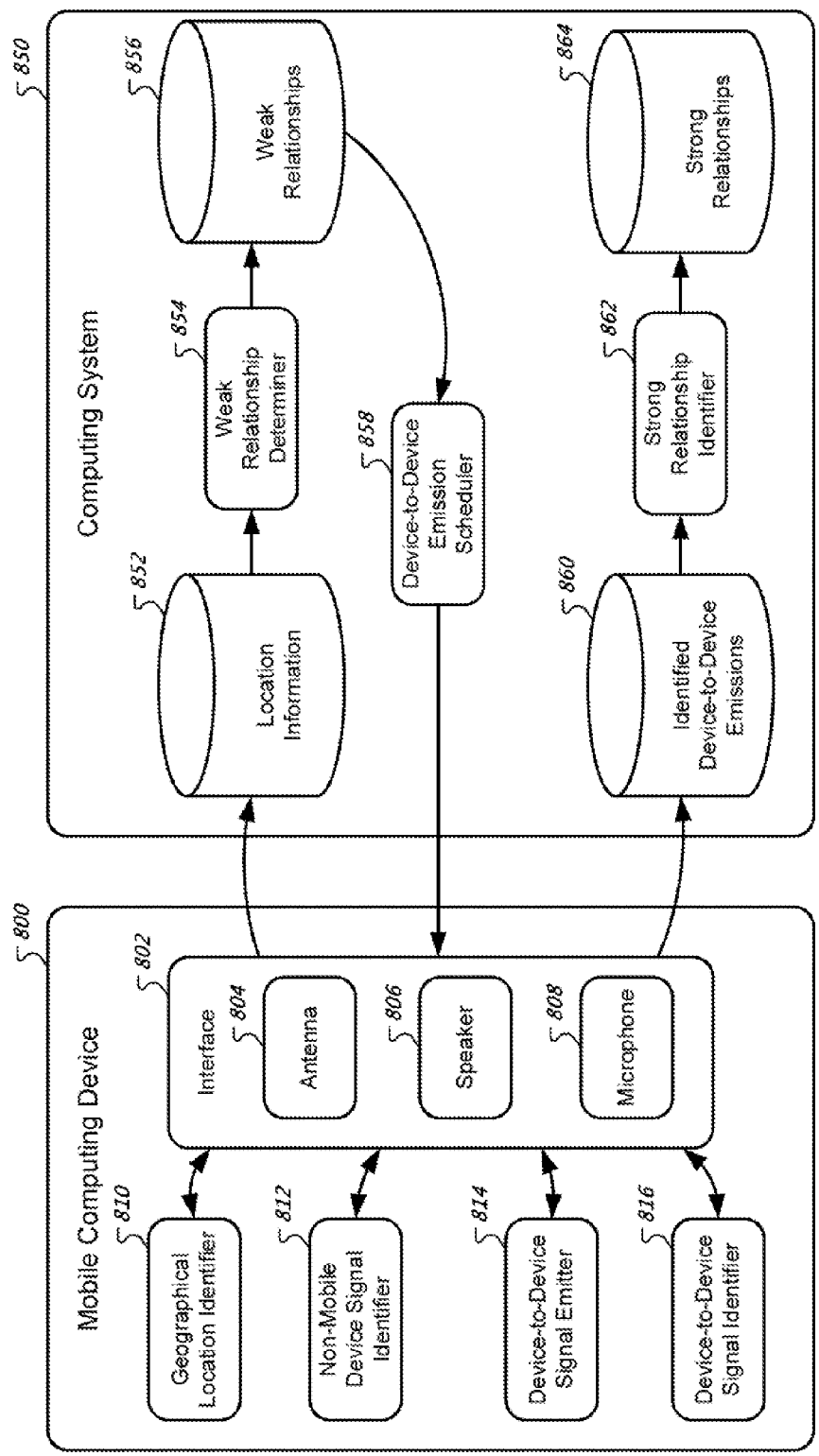
FIG. 8 shows a conceptual diagram of a system for identifying that one or more mobile computing devices are geographically near to a first mobile computing device.

FIG. 8 shows a conceptual diagram of a system for identifying that one or more mobile computing devices are geographically near to a first mobile computing device. The system includes a computing system 850 and multiple mobile computing devices. A single mobile computing device 800 is shown for simplicity.

The mobile computing device 800 receives electromagnetic signals through the antenna 804 from transmitting devices. The received signals enable the computing system 850 to determine other mobile computing devices that are nearby to the mobile computing device 800. In some examples, the geographical location identifier 810 identifies an estimated geographical location of the mobile computing device 800, for example, using GPS location identification techniques, cellular tower identification, or cellular tower triangulation.

In all these instances, the mobile computing device 800 receives signals from external devices through one or more antenna 804 of mobile computing device interface 802. The mobile computing device 800 may transmit the estimated geographical location of the mobile computing device 800 (or information sufficient to determine the estimated geographical location) to the computing system 850. The computing system 850 may store estimated geographical locations for multiple mobile computing devices in location information storage 852.

In some examples, non-mobile device signal identifier 812 identifies transmitting devices from which the mobile computing device 800 is receiving signals. The mobile computing device 800 may receive the signals through one or more antenna 804 and may wirelessly transmit to the computing system 850 unique identifiers of the transmitting devices. The computing system 850 may store, in the location information storage 852 for each of multiple mobile computing devices, the identifiers of the mobile computing device's sensed transmitting devices.

The weak relationship determiner 854 may use the information from the location information storage 852 in order to determine, for each mobile computing device, a list of zero or more weak relationships to other mobile computing devices. The weak relationship determiner 854 may determine the weak relationships using some or all of the operations that are described with reference to boxes 202, 204, 206, and 208 of FIG. 2. The weak relationship determiner 854 may store indications of the weak relationships in the weak relationships storage 856.

The device-to-device transmission scheduler 858 schedules, for each of the mobile computing devices, (i) time periods during which to transmit a signal for receipt by other mobile computing devices, and (ii) time periods during which to listen for signals that are transmitted by other mobile computing devices. The device-to-device transmission scheduler 858 may transmit, to mobile computing device 800, information that indicates when the mobile computing device 800 can transmit and when the mobile computing device 800 should listen for emissions.

The device-to-device signal transmitter 814 may transmit a signal during time periods during which the scheduler 858 indicated that the signal transmitter 814 should transmit. In some examples, the transmission includes sound waves that are generated using the speaker 806.

The device-to-device signal identifier 816 determines whether a signal is detected during the time periods that the scheduler 858 indicated that the mobile computing device 800 should listen for emissions. As described throughout this disclosure, the signal identifier 816 may detect sound using the microphone 808, may sample the sound, and may perform signal correlation on the sampled sound data.

The signal may be detected at the mobile computing device 800 directly from the transmitting mobile computing device without passing through another computing device. For example, the signal may transmit directly from the speaker of the transmitting mobile computing device over the air and to the microphone 808 without being detected and rebroadcast by another computing device. The mobile computing device 800 transmits to the computing system 850 indications of whether or not the mobile computing device 800 identified signals for specific time periods.

The computing system 850 may store, for multiple mobile computing devices in the identified device-to-device emissions storage 860, indications of whether or not the mobile computing devices identified signals for specific time periods.

The strong relationship identifier 862 may use the information from the identified device-to-device emissions storage 860 to determine those mobile computing devices that have a strong relationship with each other. In some examples, the strong relationship identifier 862 performs some or all of the operations of boxes 210, 212, and 214 of FIG. 2. The strong relationship identifier 862 may store indications of the strong relationships in the strong relationships storage 864.

Figure 9:
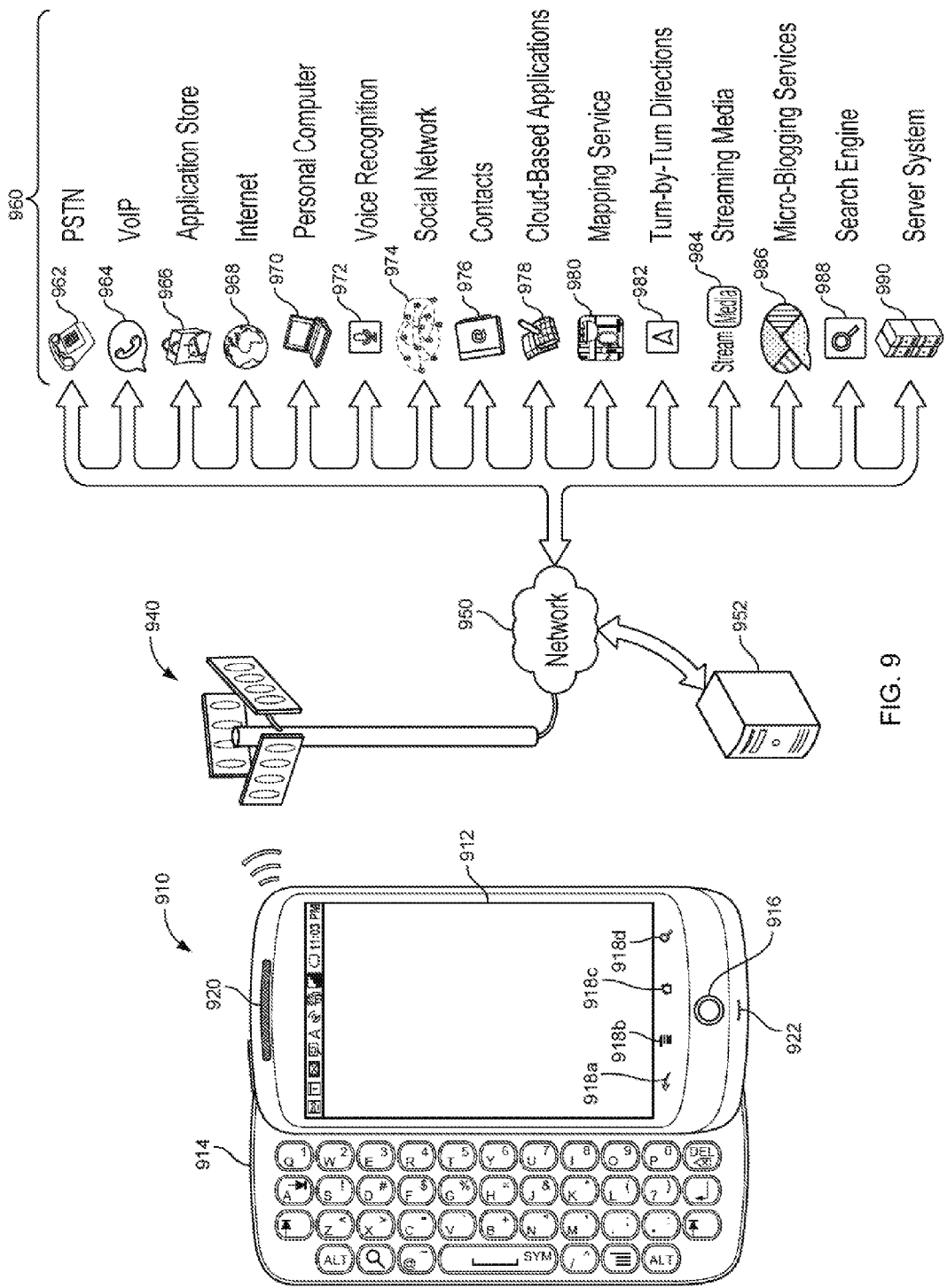
FIG. 9 is a conceptual diagram of a system that may be used to implement the systems and methods described in this document.

Referring now to FIG. 9, a conceptual diagram of a system that may be used to implement the systems and methods described in this document is illustrated. In the system, mobile computing device 910 can wirelessly communicate with base station 940, which can provide the mobile computing device wireless access to numerous hosted services 960 through a network 950.

In this illustration, the mobile computing device 910 is depicted as a handheld mobile telephone (e.g., a smartphone, or application telephone) that includes a touchscreen display device 912 for presenting content to a user of the mobile computing device 910 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 914, physical buttons, trackballs, accelerometers, gyroscopes, and magnetometers).

Example visual output mechanism in the form of display device 912 may take the form of a 3.7 or 4.3 inch LED or AMOLED display with resistive or capacitive touch capabilities, for displaying video, graphics, images, and text, and coordinating user touch inputs locations with the location of displayed information so that user contact at a location of a displayed item may be associated with the item by the device 910. The mobile computing device 910 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 914, which may be a full qwerty keyboard or a traditional keypad that includes keys for the digits '0-9', '*', and '#.' The keyboard 914 receives input when a user physically contacts or depresses a keyboard key. User manipulation of a trackball 916 or interaction with a track pad enables the user to supply directional and rate of rotation information to the mobile computing device 910 (e.g., to manipulate a position of a cursor on the display device 912).

The mobile computing device 910 may be able to determine a position of physical contact with the touchscreen display device 912 (e.g., a position of contact by a finger or a stylus). Using the touchscreen 912, various "virtual" input mechanisms may be produced, where a user interacts with a graphical user interface element depicted on the touchscreen 912 by contacting the graphical user interface element. An example of a "virtual" input mechanism is a "software keyboard," where a keyboard is displayed on the touchscreen and a user selects keys by pressing a region of the touchscreen 912 that corresponds to each key.

The mobile computing device 910 may include mechanical or touch sensitive buttons 918*a-d*. Additionally, the mobile computing device may include buttons for adjusting volume output by the one or more speakers 920, and a button for turning the mobile computing device on or off. A microphone 922 allows the mobile computing device 910 to convert audible sounds into an electrical signal that may be digitally encoded and stored in computer-readable memory, or transmitted to another computing device. The mobile computing device 910 may also include a digital compass, an accelerometer, a gyroscope, a barometer for providing measurements in change of altitude, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 910 may present a graphical user interface with the touchscreen 912. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 904. User-selection of the button may invoke the pre-defined action.

In some examples, the operating system provides a "desktop" user interface that is displayed upon turning on the mobile computing device 910, activating the mobile computing device 910 from a sleep state, upon "unlocking" the mobile computing device 910, or upon receiving user-selection of the "home" button 918c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 910 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 912 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 910 may include one or more location-identification mechanisms. A location-identification mechanism may include a collection of hardware and software that provides the operating system and application programs an estimate of the mobile telephone's geographical location. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 910 may include other application modules and hardware. A call handling unit may receive an indication of an incoming telephone call and provide a user the capability to answer the incoming telephone call. A media player may allow a user to listen to music or play movies that are stored in local memory of the mobile computing device 910. The mobile telephone 910 may include a digital camera sensor, and corresponding image and video capture and editing software. An internet browser may enable the user to view content from a web page by typing in an addresses corresponding to the web page or selecting a link to the web page.

The mobile computing device 910 may include an antenna to wirelessly communicate information with the base station 940. The base station 940 may be one of many base stations in a collection of base stations (e.g., a mobile telephone cellular network) that enables the mobile computing device 910 to maintain communication with a network 950 as the mobile computing device is geographically moved. The computing device 910 may alternatively or additionally communicate with the network 950 through a Wi-Fi router or a wired connection (e.g., Ethernet, USB, or FIREWIRE). The computing device 910 may also wirelessly communicate with other computing devices using BLUETOOTH protocols, or may employ an ad-hoc wireless network.

A service provider that operates the network of base stations may connect the mobile computing device 910 to the network 950 to enable communication between the mobile computing device 910 and other computerized devices that provide services 960. Although the services 960 may be provided over different networks (e.g., the service provider's internal network, the Public Switched Telephone Network, and the Internet), network 950 is illustrated as a single network. The service provider may operate a server system 952 that routes information packets and voice data between the mobile computing device 910 and computing devices associated with the services 960.

The network 950 may connect the mobile computing device 910 to the Public Switched Telephone Network (PSTN) 962 in order to establish voice or fax communication between the mobile computing device 910 and another computing device. For example, the service provider server system 952 may receive an indication from the PSTN 962 of an incoming call for the mobile computing device 910. Conversely, the mobile computing device 910 may send a communication to the service provider server system 952 initiating a telephone call with a telephone number that is associated with a device accessible through the PSTN 962.

The network 950 may connect the mobile computing device 910 with a Voice over Internet Protocol (VoIP) service 964 that routes voice communications over an IP network, as opposed to the PSTN. For example, a user of the mobile computing device 910 may invoke a VoIP application and initiate a call using the program. The service provider server system 952 may forward voice data from the call to a VoIP service, which may route the call over the internet to a corresponding computing device, potentially using the PSTN for a final leg of the connection.

An application store 966 may provide a user of the mobile computing device 910 the ability to browse a list of remotely stored application programs that the user may download over the network 950 and install on the mobile computing device 910. The application store 966 may serve as a repository of applications developed by third-party application developers. An application program that is installed on the mobile computing device 910 may be able to communicate over the network 950 with server systems that are designated for the application program. For example, a VoIP application program may be downloaded from the Application Store 966, enabling the user to communicate with the VoIP service 964.

The mobile computing device 910 may access content on the internet 968 through network 950. For example, a user of the mobile computing device 910 may invoke a web browser application that requests data from remote computing devices that are accessible at designated universal resource locations. In various examples, some of the services 960 are accessible over the internet.

The mobile computing device may communicate with a personal computer 970. For example, the personal computer 970 may be the home computer for a user of the mobile computing device 910. Thus, the user may be able to stream media from his personal computer 970. The user may also view the file structure of his personal computer 970, and transmit selected documents between the computerized devices.

A voice recognition service 972 may receive voice communication data recorded with the mobile computing device's microphone 922, and translate the voice communication into corresponding textual data. In some examples, the translated text is provided to a search engine as a web query, and responsive search engine search results are transmitted to the mobile computing device 910.

The mobile computing device 910 may communicate with a social network 974. The social network may include numerous members, some of which have agreed to be related as acquaintances. Application programs on the mobile computing device 910 may access the social network 974 to retrieve information based on the acquaintances of the user of the mobile computing device. For example, an "address book" application program may retrieve telephone numbers for the user's acquaintances. In various examples, content may be delivered to the mobile computing device 910 based on social network distances from the user to other members. For example, advertisement and news article content may be selected for the user based on a level of interaction with such content by members that are "close" to the user (e.g., members that are "friends" or "friends of friends").

The mobile computing device 910 may access a personal set of contacts 976 through network 950. Each contact may identify an individual and include information about that individual (e.g., a phone number, an email address, and a birthday). Because the set of contacts is hosted remotely to the mobile computing device 910, the user may access and maintain the contacts 976 across several devices as a common set of contacts.

The mobile computing device 910 may access cloud-based application programs 978. Cloud-computing provides application programs (e.g., a word processor or an email program) that are hosted remotely from the mobile computing device 910, and may be accessed by the device 910 using a web browser or a dedicated program. Example cloud-based application programs include GOOGLE DOCS word processor and spreadsheet service, GOOGLE GMAIL webmail service, and PICASA picture manager.

Mapping service 980 can provide the mobile computing device 910 with street maps, route planning information, and satellite images. An example mapping service is GOOGLE MAPS. The mapping service 980 may also receive queries and return location-specific results. For example, the mobile computing device 910 may send an estimated location of the mobile computing device and a user-entered query for "pizza places" to the mapping service 980. The mapping service 980 may return a street map with "markers" superimposed on the map that identify geographical locations of nearby "pizza places."

Turn-by-turn service 982 may provide the mobile computing device 910 with turn-by-turn directions to a user-supplied destination. For example, the turn-by-turn service 982 may stream to device 910 a street-level view of an estimated location of the device, along with data for providing audio commands and superimposing arrows that direct a user of the device 910 to the destination.

Various forms of streaming media 984 may be requested by the mobile computing device 910. For example, computing device 910 may request a stream for a pre-recorded video file, a live television program, or a live radio program. Example services that provide streaming media include YOUTUBE and PANDORA.

A micro-blogging service 986 may receive from the mobile computing device 910 a user-input post that does not identify recipients of the post. The micro-blogging service 986 may disseminate the post to other members of the micro-blogging service 986 that agreed to subscribe to the user.

A search engine 988 may receive user-entered textual or verbal queries from the mobile computing device 910, determine a set of internet-accessible documents that are responsive to the query, and provide to the device 910 information to display a list of search results for the responsive documents. In examples where a verbal query is received, the voice recognition service 972 may translate the received audio into a textual query that is sent to the search engine.

These and other services may be implemented in a server system 990. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data. "Transmitting" can also describe the first device emitting a sound wave or an electromagnetic wave, but may not include the second device receiving the emitted sound or electromagnetic wave. Conversely, "receiving" from a first device may include receiving the emitted sound or electromagnetic wave, but may not include the first device transmitting or emitting the sound or electromagnetic wave.

Figure 10:
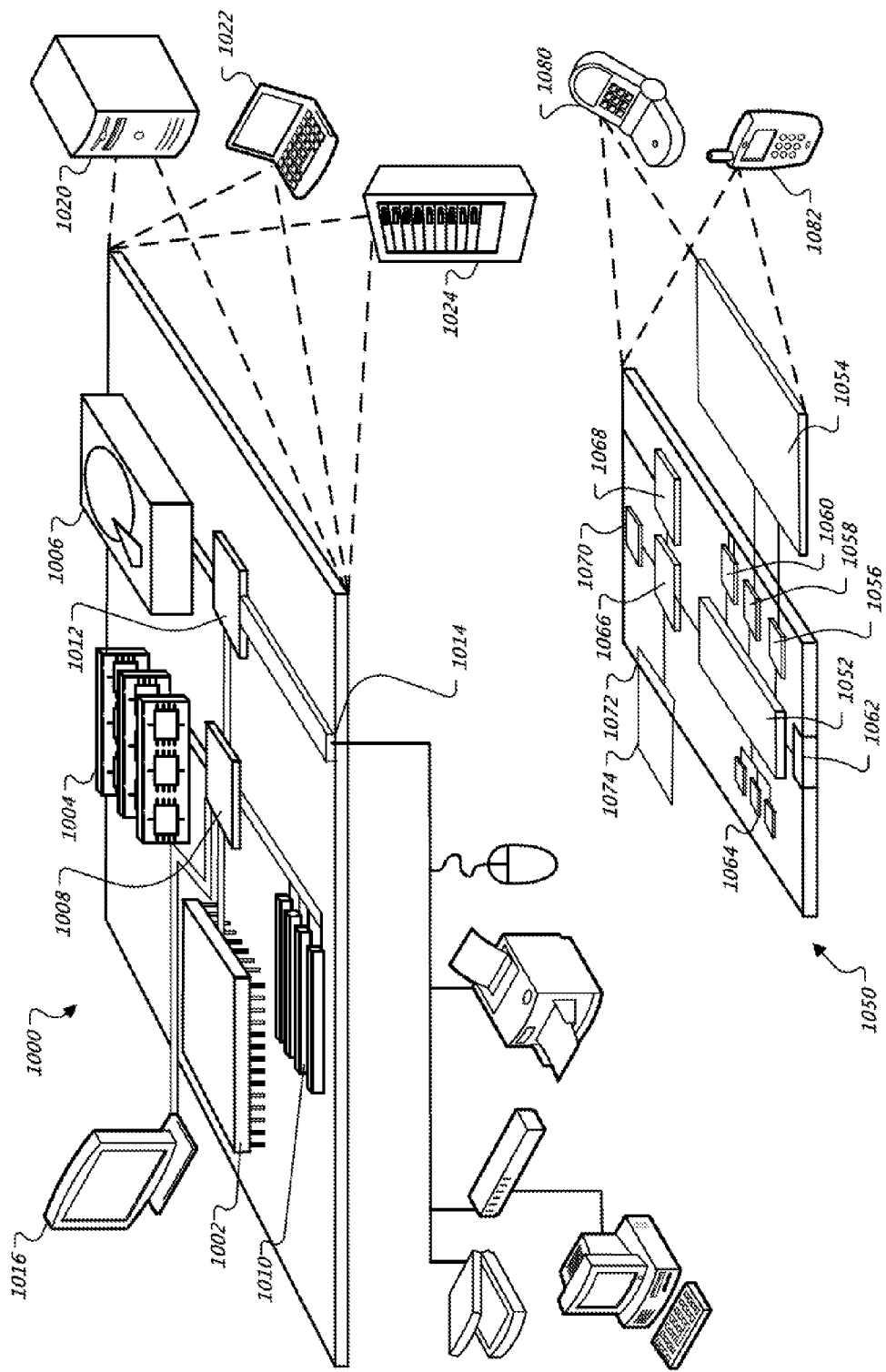
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for identifying proximity of a mobile computing device to another mobile computing device, the method comprising:
   determining, by a computing system, a set of mobile computing devices that are geographically proximate to a first mobile computing device, based at least in part on determining that both the first mobile computing device and each of the mobile computing devices in the set have received a first type of signal from a same emitting device;

requesting, by the computing system and in response to having determined the set of mobile computing devices, that the first mobile computing device or at least some mobile computing devices from the set of mobile computing devices emit a second type of signal; and determining, by the computing system, subsequent to determining the set of mobile computing devices and requesting that the first mobile computing device or the at least some mobile computing devices emit the second type of signal, a subset of the set of mobile computing devices that share a physical space with the first mobile computing device, based at least in part on determining that:

(i) the first mobile computing device detected that the second type of signal was emitted from each of the mobile computing devices in the subset, or (ii) each of the mobile computing devices detected that the second type of signal was emitted by the first mobile computing device.

2. The computer-implemented method of claim 1, wherein the second type of signal is a mechanical sound wave type of signal.

3. The computer-implemented method of claim 2, wherein the mechanical sound wave type of signal is in a range of 10 kHz to 28 kHz.

4. The computer-implemented method of claim 1, wherein:
the set of mobile computing devices are determined as being from a larger group of mobile computing devices;
multiple of the mobile computing devices from the larger group emit the second type of signal at a same time; and
only a single of the mobile computing devices in the set emits the second type of signal at the same time.

5. The computer-implemented method of claim 1, wherein determining the subset of the set of mobile computing devices is further based at least in part on identifying that:

(i) the first mobile computing device detected that the second type of signal was emitted from each of the mobile computing devices in the subset, and (ii) each of the mobile computing devices in the subset detected that the second type of signal was emitted by the first mobile computing device.

6. The computer-implemented method of claim 1, wherein the second type of signal does not identify a specific mobile computing device.

7. The computer-implemented method of claim 1, wherein the first type of signal is an electromagnetic signal.

8. The computer-implemented method of claim 7, wherein the emitting device is selected from a group consisting of: (i) a base station for a mobile network, and (ii) a wireless router.

9. The computer-implemented method of claim 7, wherein the emitting device from which a second mobile computing device in the set and the first mobile computing device received the first type of signal is different than the emitting device from which a third mobile computing device in the set and the first mobile computing device received the first type of signal.

10. The computer-implemented method of claim 1, wherein determining the set of mobile computing devices that are geographically proximate to the first mobile computing device includes identifying that each of the mobile computing devices in the set are within a threshold distance from the first mobile computing device using a satellite-based geographical location identification system.

11. The computer-implemented method of claim 1, wherein the emitting device is not a part of the set of mobile computing devices.

12. A computerized system, comprising:
computer-readable memory, accessible to a computing system, that stores information that indicates a set of computing devices that have been determined to have a first indication of geographical proximity to a first computing device;

a first computing sub-system, at the computing system, to determine that the computing devices from the set have the first indication of geographical proximity to the first computing device based on the computing devices from the set and the first computing device each receiving an electromagnetic transmission from a same electromagnetic emitting device;

a second computing sub-system, at the computing system, that schedules times for the computing devices from the set to emit a second type of signal in response to a determination by the first computing sub-system that the computing devices from the set have the first indication of geographical proximity to the first computing device; and a third computing sub-system, at the computing system, to determine that one or more of the computing devices from the set have a second indication of geographical proximity to the first computing device based on the first computing device detecting the second type of signal at a time or times during which the one or more of the multiple computing devices was scheduled to emit the second type of signal.

13. The computerized system of claim 12, further comprising the first computing device.

14. The computerized system of claim 12, wherein the second indication of geographical proximity provides an indication of closer geographical proximity between the first computing device and another computing device than the first indication of geographical proximity.

* * * * *